United States Patent
Ogawa et al.

(10) Patent No.: US 10,810,889 B2
(45) Date of Patent: Oct. 20, 2020

(54) OPERATING DEVICE, OPERATING METHOD, OPERATING SYSTEM, AND OPERATING PROGRAM

(71) Applicant: TOPCON CORPORATION, Itabashi-ku, Tokyo (JP)

(72) Inventors: Mitsuru Ogawa, Tokyo (JP); Hajime Shinozaki, Tokyo (JP); Nobuyuki Nishita, Tokyo (JP)

(73) Assignee: TOPCON CORPORATION, Tokyo (JP)

(*) Notice: Subject to any disclaimer, the term of this patent is extended or adjusted under 35 U.S.C. 154(b) by 278 days.

(21) Appl. No.: 15/866,966

(22) Filed: Jan. 10, 2018

(65) Prior Publication Data
US 2018/0197421 A1  Jul. 12, 2018

(30) Foreign Application Priority Data
Jan. 11, 2017  (JP) ................ 2017-002419

(51) Int. Cl.
*G08G 5/00* (2006.01)
*B64C 39/02* (2006.01)
(Continued)

(52) U.S. Cl.
CPC ......... *G08G 5/0069* (2013.01); *B64C 39/024* (2013.01); *G01C 5/00* (2013.01);
(Continued)

(58) Field of Classification Search
CPC .. G08G 5/0069; G08G 5/0082; G08G 5/0026; G08G 5/003; G01S 17/86; G01S 19/42; G01S 17/66; G01S 19/48; G01C 5/00; G01C 19/48; G01C 15/002; B64C 39/024; B64C 2201/146; B64C 2201/024
See application file for complete search history.

(56) References Cited

U.S. PATENT DOCUMENTS 9,773,420 B2 * 9/2017 Ohtomo ............... G05D 1/0094
9,958,268 B2 * 5/2018 Ohtomo ............... G01C 15/002
(Continued)

FOREIGN PATENT DOCUMENTS

JP  2009-229192 A  10/2009
JP  2012-202821 A  10/2012

*Primary Examiner* — Russell Frejd
(74) *Attorney, Agent, or Firm* — Chiesa Shahinian & Giantomasi PC

(57) ABSTRACT

A technique for more reliably capturing a lost unmanned aerial vehicle in tracking the unmanned aerial vehicle by a surveying device is provided. A UAV search area setting part is configured to perform arithmetic operation for searching for an unmanned aerial vehicle having mounted therein a location identifying device using a GNSS. The UAV search area setting part includes a measured location obtaining part that obtains information of a location of the unmanned aerial vehicle, which is measured by a surveying device, a scheduled flight location obtaining part that obtains information of a scheduled flight location of the unmanned aerial vehicle from a flight plan of the unmanned aerial vehicle, and a search area setting part that sets an area for searching for the unmanned aerial vehicle by referring to a difference between the measured location and the scheduled flight location at a specific time.

3 Claims, 5 Drawing Sheets

(51) Int. Cl.
  *G01S 19/42*   (2010.01)
  *G01S 17/66*   (2006.01)
  *G01C 5/00*    (2006.01)
  *G01S 19/48*   (2010.01)
  *G01C 15/00*   (2006.01)
  *G01S 17/86*   (2020.01)

(52) U.S. Cl.
  CPC .............. *G01C 15/00* (2013.01); *G01S 17/66* (2013.01); *G01S 17/86* (2020.01); *G01S 19/42* (2013.01); *G01S 19/48* (2013.01); *G08G 5/003* (2013.01); *G08G 5/0026* (2013.01); *G08G 5/0082* (2013.01); *B64C 2201/024* (2013.01); *B64C 2201/146* (2013.01)

(56) References Cited

U.S. PATENT DOCUMENTS

| | | | |
|---|---|---|---|
| 10,162,353 B2 * | 12/2018 | Hammond | G01S 17/66 |
| 10,324,183 B2 * | 6/2019 | Ohtomo | G06T 7/30 |
| 10,416,668 B2 * | 9/2019 | Hammond | G06F 3/0484 |
| 2014/0210663 A1 * | 7/2014 | Metzler | G01C 15/00 |
| | | | 342/357.34 |

* cited by examiner

OPERATING DEVICE, OPERATING METHOD, OPERATING SYSTEM, AND OPERATING PROGRAM

CROSS-REFERENCE TO RELATED APPLICATION

This application is based upon and claims the benefit of priority from Japanese Patent Application No. 2017-002419, filed Jan. 11, 2017, the entire contents of which are incorporated herein by reference.

TECHNICAL FIELD

The present invention relates to a technique for locating an unmanned aerial vehicle.

BACKGROUND

Technologies using an unmanned aerial vehicle (UAV) in surveying are publicly known. The UAV used in these technologies may have mounted therein a location measuring device using a global navigation satellite system (GNSS) (called a "GNSS receiver"), an inertial measurement unit (IMU), an altimeter, and a camera. Such a UAV may be made to photograph the ground while flying along a predetermined path in aerial photogrammetry or in other surveying.

Typical aerial photogrammetry requires installation of airphoto signals (reference points), which is complicated work. However, the aerial photogrammetry using the UAV can be performed without the airphoto signals or with fewer airphoto signals by obtaining location data of the camera with high accuracy. The UAV that autonomously flies identifies its own location by using a GNSS, which is independent positioning in principle, and therefore, the positioning result contains a positioning error. The positioning error causes lack of high accuracy that is required in the photogrammetry using the UAV and using fewer reference points. Mounting of a more highly accurate location measuring device using a GNSS on the UAV may be considered, but this idea is difficult to apply to a general purpose UAV in consideration of weight and electric power consumption of the device. To solve these problems, a total station (TS) may be used to track a UAV in flight and locate the UAV by using its laser distance measuring function (for example, refer to US2014/0210663).

This method of tracking the UAV by the TS uses an automatic target-tracking function of the TS. In this technique, scanning laser light is used to capture and track the UAV. The UAV has a reflective prism that reflects the scanning laser light back in the incident direction, and the TS detects light reflected from the reflective prism to track the UAV.

The UAV can typically move unpredictably due to winds and other factors, and the TS may lose sight of the UAV. The TS may also lose sight of the UAV due to shutoff of tracking light by obstacles, such as tree branches, leaves, birds, utility poles, and electrical lines, between the TS and the UAV while tracking the UAV.

Although the TS has a function of searching for a target, there are many errors in recapturing a lost UAV when targeting a UAV that moves in the air (although there are of course also cases of successful recapturing of UAVs). To solve this problem, a flight plan of a UAV may be preliminarily obtained by a TS so that the TS will predict a flight path of the UAV on the basis of the flight plan to search for the UAV.

However, measurement accuracy, in particular, in an altitude direction, is not high in a positioning technique using a GNSS. Some UAVs have mounted therein an altimeter that measures atmospheric pressure changes, but since the absolute value of the atmospheric pressure varies due to effects of weather and other factors, correctly measuring their own altitude is difficult even for these UAVs.

For such reasons, there are many cases in which a UAV may fly at an altitude deviating from the original altitude of the flight plan. In these cases, searches for the UAV on the basis of the flight plan generate positioning errors in the altitude direction and are hindered. That is, the positioning errors in the altitude information of the UAV cause the TS to perform searches using a misestimated altitude direction. Additionally, a technique for monitoring a UAV in flight at all times is required from the viewpoint of safety, and a technique for tracking a UAV using a TS can be applied thereto. However, in this case, also, a method of coping with the situation in which the TS loses sight of the UAV is required.

BRIEF SUMMARY OF THE EMBODIMENTS

In view of these circumstances, an object of the present invention is to provide a technique for searching for a UAV while minimizing effects of deviations in flight altitude of the UAV from a flight plan.

A first aspect of the present invention provides an operating device configured to perform arithmetic operation for searching for an unmanned aerial vehicle having mounted therein a location identifying device using a GNSS. The operating device includes a measured location obtaining part, a scheduled flight location obtaining part, and a search area setting part. The measured location obtaining part obtains information of a location of the unmanned aerial vehicle, which is measured by a surveying device. The scheduled flight location obtaining part obtains information of a scheduled flight location of the unmanned aerial vehicle from a flight plan of the unmanned aerial vehicle. The search area setting part sets an area for searching for the unmanned aerial vehicle by referring to a difference between the measured location and the scheduled flight location at a specific time.

According to a second aspect of the present invention, in the first aspect of the present invention, the measured location may represent a measured altitude, and the scheduled flight location may represent a scheduled altitude. According to a third aspect of the present invention, in the second aspect of the present invention, the difference between the measured altitude and the scheduled altitude may be calculated at multiple timings, and the area for searching for the unmanned aerial vehicle may be set by referring to the difference of the measured altitude and the scheduled altitude at the time closest to the time when the surveying device fails to measure the location of the unmanned aerial vehicle.

According to a fourth aspect of the present invention, in the second aspect of the present invention, the difference between the measured altitude and the scheduled altitude may be calculated at multiple timings, and the area for searching for the unmanned aerial vehicle may be set by referring to fluctuations in the difference between the measured altitude and the scheduled altitude as time elapses. According to a fifth aspect of the present invention, in any one of the second to the fourth aspects of the present invention, a location of the surveying device may be preliminarily determined by relative positioning, and the area for searching for the unmanned aerial vehicle may be set by referring to a difference between the preliminarily determined location of the surveying device and a location of the surveying device that is determined at the preliminarily determined location by independent positioning.

According to a sixth aspect of the present invention, in the fifth aspect of the present invention, the operating device may further include a comparing part. The comparing part may compare a difference "A" between the preliminarily determined location of the surveying device and the location of the surveying device that is determined at the preliminarily determined location by independent positioning, and a difference "B" between the measured altitude and the scheduled altitude at the specific time, with each other. The setting of the area for searching for the unmanned aerial vehicle processing according to the fifth aspect of the present invention is performed when the result of the comparison satisfies a predetermined condition.

A seventh aspect of the present invention provides an operating method for searching for an unmanned aerial vehicle having mounted therein a location identifying device using a GNSS. The operating method includes obtaining information of a location of the unmanned aerial vehicle, which is measured by a surveying device, obtaining information of a scheduled flight location of the unmanned aerial vehicle from a flight plan of the unmanned aerial vehicle, and setting an area for searching for the unmanned aerial vehicle by referring to a difference between the measured location and the scheduled flight location at a specific time.

An eighth aspect of the present invention provides an operating system configured to perform arithmetic operation for searching for an unmanned aerial vehicle having mounted therein a location identifying device using a GNSS. The operating system includes a measured location obtaining part, a scheduled flight location obtaining part, and a search area setting part. The measured location obtaining part obtains information of a location of the unmanned aerial vehicle, which is measured by a surveying device. The scheduled flight location obtaining part obtains information of a scheduled flight location of the unmanned aerial vehicle from a flight plan of the unmanned aerial vehicle. The search area setting part sets an area for searching for the unmanned aerial vehicle by referring to a difference between the measured location and the scheduled flight location at a specific time.

A ninth aspect of the present invention provides a non-transitory computer recording medium storing computer executable instructions that, when executed by a computer processor in a search for an unmanned aerial vehicle having mounted therein a location identifying device using a GNSS, cause the computer processor to: obtain information of a location of the unmanned aerial vehicle, which is measured by a surveying device, obtain information of a scheduled flight location of the unmanned aerial vehicle from a flight plan of the unmanned aerial vehicle, and set an area for searching for the unmanned aerial vehicle by referring to a difference between the measured location and the scheduled flight location at a specific time.

The present invention enables more reliable locating of a lost unmanned aerial vehicle in a technique of tracking the unmanned aerial vehicle by a surveying device.

DETAILED DESCRIPTION

Outline

Figure 1:
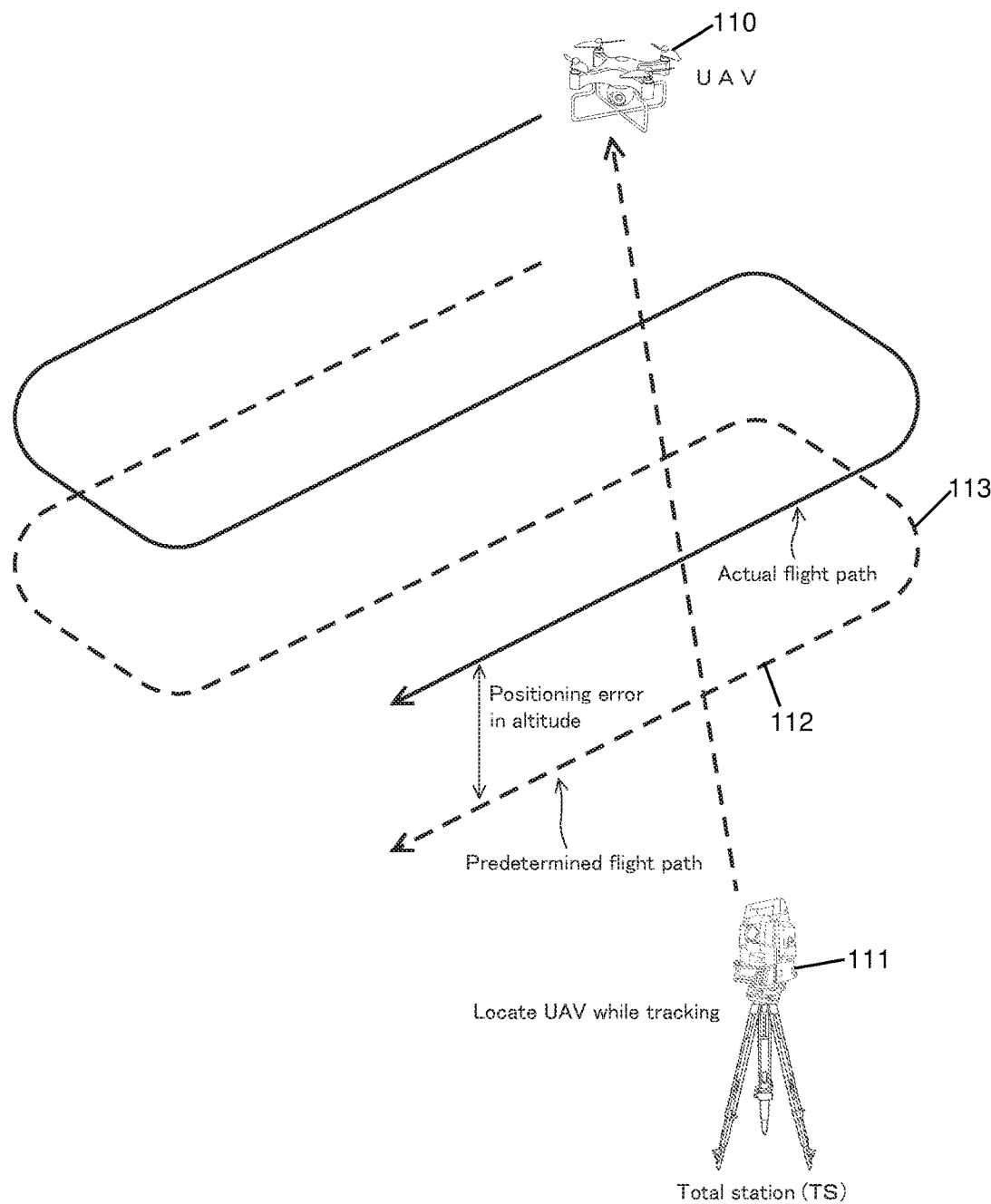
FIG. 1 is a principle diagram relating to measurement of the location of a UAV.

FIG. 1 shows an unmanned aerial vehicle (UAV) 110 in flight and a total station (TS) 111 arranged on the ground. A commercially available UAV can be used, and the UAV can autonomously fly along a predetermined flight path 112 and conduct photographing for aerial photogrammetry. Also, the flight of the UAV can be wirelessly controlled. The UAV is mounted with a camera, a location identifying device using a global navigation satellite system (GNSS) (for example, a GNSS receiver), an inertial measurement unit (IMU), an altimeter, a storage for storing a predetermined flight path and flight log, and a control unit for flight.

The UAV flies along a predetermined flight path at a predetermined speed by using its location identifying device that uses the GNSS and by using its IMU. The location identifying device can generate positioning errors, and therefore, there is some degree of margin for error between the predetermined flight path and the flight path actually passed through 113. The progress of the flight is stored in a flight log file. The flight log file contains information of time and location (latitude, longitude, and altitude) in association with each other.

The UAV is attached with a dedicated reflective prism at a position that is easy to view from the outside (a position easy for the TS to find, for example, a bottom of the UAV). The reflective prism receives and reflects both scanning laser light from the TS and distance measuring laser light. The reflective prism is a dedicated target for surveying that is performed by using the TS and reflects incident laser light back in the incident direction.

The TS has a highly accurate location measuring device that performs relative positioning using a GNSS, a camera for obtaining images, a laser scanning function for searching for a target (the reflective prism), a laser distance measuring function for measuring a distance to the target by using distance measuring laser light, and a measuring function for measuring the angles (a horizontal angle and a vertical angle, which is an elevation angle or a depression angle) of the target of which the distance is measured by using the laser light. Measuring the distance and the angles of the target provides the location of the target relative to the TS. Under conditions in which the location of the TS is known, the location of the target (here, the UAV) in a map coordinate system (latitude, longitude, and altitude) is determined. These functions are normally provided to a commercially available TS and are not special. These techniques relating to the TS may be found in Japanese Unexamined Patent Applications Laid-Open Nos. 2009-229192 and 2012-202821, for example. The map coordinate system describes map information (for example, latitude, longitude, and altitude or elevation). For example, location information obtained from the GNSS is normally described in the map coordinate system.

As shown in FIG. 1, the flight altitude of the UAV tends to deviate from the altitude of a flight plan. This is due to positioning errors generated by altitude measuring units (GNSS unit and altimeter) mounted on the UAV. That is, even though the UAV autonomously flies according to the flight plan, the actual altitude of the UAV tends to deviate from the altitude of the flight plan due to the positioning errors in measured altitude.

When the TS loses sight of the UAV during tracking the UAV, the TS searches for the UAV by referring to the flight plan, but can fail to find the UAV due to the deviation from the flight plan in actual flight of the UAV. This embodiment of the present invention enables decrease in the effect of the positioning errors in the altitude direction and thereby increases the efficiency of searching for the UAV.

Figure 2:
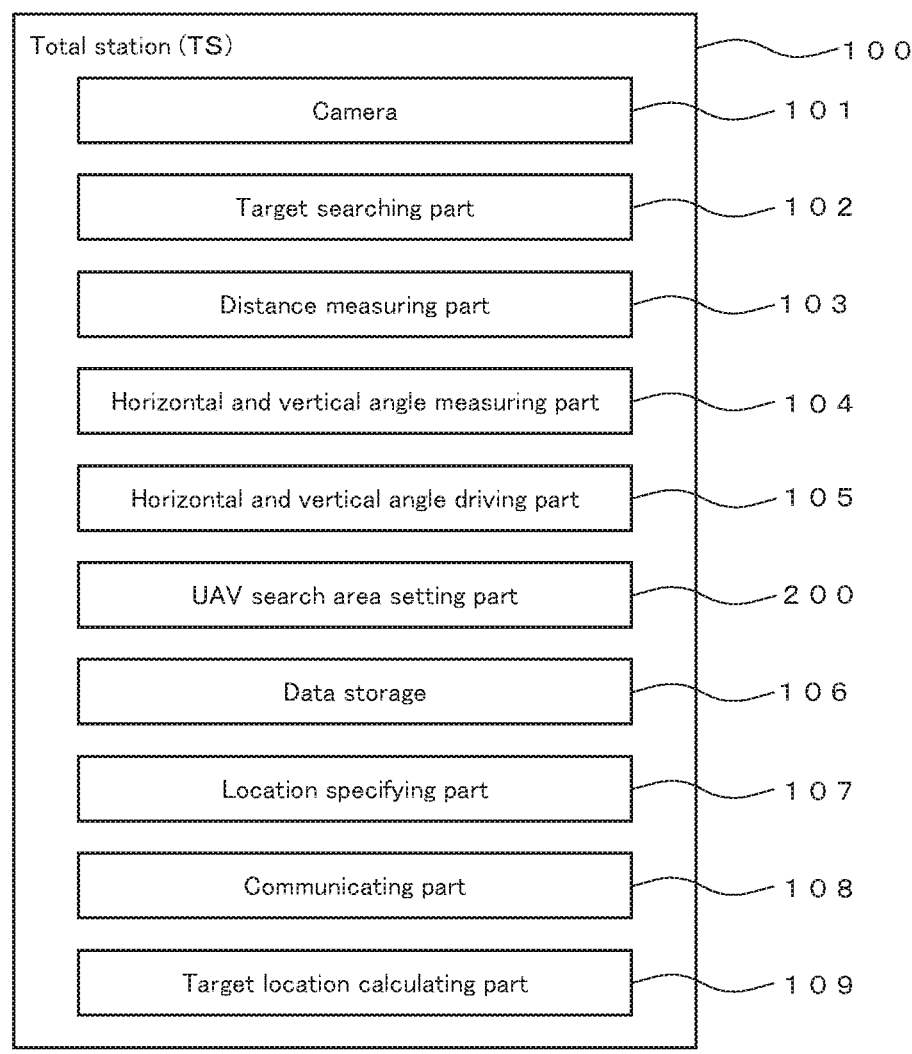
FIG. 2 is a block diagram of a total station.

Hereinafter, an example of a TS used in this embodiment of the present invention will be described. FIG. 2 shows a block diagram of a TS 100. The TS 100 has a configuration that is the same as or similar to that of a commercially available TS, except for a UAV search area setting part 200. The TS 100 includes a camera 101, a target searching part 102, a distance measuring part 103, a horizontal and vertical angle measuring part 104, a horizontal and vertical angle driving part 105, a UAV search area setting part 200, a data storage 106, a location specifying part 107, a communicating part 108, and a target location calculating part 109.

The camera 101 photographs moving images or still images of an object to be surveyed, such as a target. The data of the images photographed by the camera 101 is stored in an appropriate storage area in association with measurement times, measurement angles, measurement distances, locations, and other parameters, of the object, for which distance is to be measured. In this embodiment, the camera 101 obtains images of the UAV. The target searching part 102 searches for the target by using searching laser light that is composed of fan-shaped beams. The distance measuring part 103 measures a distance to the target by using distance measuring laser light. The horizontal and vertical angle measuring part 104 measures a horizontal angle and a vertical angle (elevation angle or depression angle) of the target of which the distance is measured by the distance measuring part 103. An optical system for the target searching part 102 and the distance measuring part 103 is provided to a casing part of which horizontal rotation and elevation or depression angle are controllable. The horizontal angle and the vertical angle are measured by an encoder. The output of the encoder is received by the horizontal and vertical angle measuring part 104, and the horizontal angle and the vertical angle (elevation angle or depression angle) are obtained.

The horizontal and vertical angle driving part 105 includes a motor, a driving circuit for the motor, and a controlling circuit for the driving circuit. The motor controls the horizontal rotation, the elevation angle, and the depression angle of the casing part, which has the optical system for the target searching part 102 and the distance measuring part 103. The UAV search area setting part 200 performs processing relating to setting of a search area for searching for the UAV in flight. The UAV search area setting part 200 will be described later. The data storage 106 stores control programs necessary for operating the TS 100, various kinds of data, survey results, and other information.

The location specifying part 107 locates the TS 100 by using the GNSS. The location specifying part 107 measures the location with high accuracy by relative positioning. The location specifying part 107 has a GNSS receiver and obtains information from a navigation satellite that the location specifying part 107 captures at the time. The location specifying part 107 also performs independent positioning and determines a difference in the altitude direction of the TS 100 between the location measured by relative positioning and the location measured by independent positioning, as a positioning error in the altitude direction generated by the TS 100. There may be cases in which locating the TS by relative positioning is not performed (for example, a case in which only independent positioning can be performed). In such cases, the UAV flies toward a scheduled flight altitude assuming that the altitude at its takeoff is regarded as zero. In this situation, the TS 100 starts to track the UAV from the takeoff position, or the TS 100 tracks the UAV in flight in the condition that the takeoff position is determined by measuring the altitude of a takeoff point by using a prism or by using no prism. In this case, the TS 100 obtains location of the UAV relative to the TS 100 instead of absolute location of the UAV.

The communicating part 108 communicates with external devices. The TS 100 can be controlled by an external terminal (a dedicated terminal, a smartphone, or other device) and can communicate with the external terminal. An example of the communication type includes a wireless communication and an optical communication. The standard of the communication is not particularly limited, and any applicable standard can be used.

The target location calculating unit 109 calculates the location (coordinates) of the target (here, the UAV) relative to the TS 100, from the distance and the angles to the target. The distance to the target is obtained by the distance measuring part 103, and the angles of the target are obtained by the horizontal and vertical angle measuring part 104. Since the TS 100 is located by the location specifying part 107, the location of the target (here, the UAV) in the map coordinate system is determined by calculating the location of the target relative to the TS 100.

Configuration of UAV Search Area Setting Part

Figure 3:
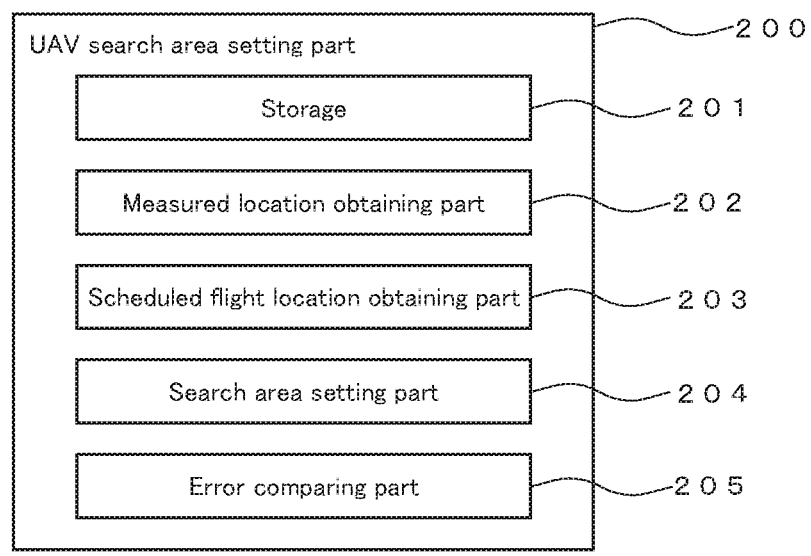
FIG. 3 is a block diagram of a UAV search area setting part.

Hereinafter, the UAV search area setting part 200 will be described. FIG. 3 is a block diagram of the UAV search area setting part 200. The UAV search area setting part 200 is a computer having a CPU, a storage, and various types of interfaces.

A part or all of functional parts shown in FIG. 3 may be respectively constructed of dedicated arithmetic circuits. A functional part constructed of software and a functional part constructed of a dedicated arithmetic circuit may be used together.

For example, each of the functional parts shown in the drawing may be constructed of an electronic circuit such as a central processing unit (CPU), an application specific integrated circuit (ASIC), or a programmable logic device (PLD) such as a field programmable gate array (FPGA). Additionally, some functions may be implemented by dedicated hardware, and the rest may be implemented by a general-purpose microcomputer.

Whether each of the functional parts is to be constructed of dedicated hardware or is to be constructed of software so that programs are executed by a CPU is selected in consideration of necessary operating speed, cost, amount of electricity consumed, and other factors. Constructing the functional part by dedicated hardware and constructing the functional part by software are equivalent to each other from the viewpoint of obtaining a specific function.

The UAV search area setting part 200 includes functional parts that are implemented as a storage 201, a measured location obtaining part 202, a scheduled flight location obtaining part 203, a search area setting part 204, and an error comparing part 205.

The storage 201 stores the same data of a predetermined flight path as stored in the UAV. The data is flight plan data containing a relationship of a location with an elapsed time from the start of the flight. For example, the data of the predetermined flight path contains scheduled flight points in association with times such that, assuming that the time at the start of flight is set as origin on a time axis and a location Pn specifies a latitude, a longitude, and an altitude, a point P1 is reached at time t1, a point P2 is reached at time t2, a point P3 is reached at time t3, and so forth.

The storage 201 also stores location data of the TS 100 (refer to FIG. 2) that has the UAV search area setting part 200. The location of the TS 100 is measured in advance by a highly accurate location measuring method using a GNSS, such as a relative positioning method, by the location specifying part 107. The flight plan data can also be downloaded from another storage or a storage medium to the UAV search area setting part 200 and can be temporarily stored in the storage 201.

The measured location obtaining part 202 obtains location information (latitude, longitude, and altitude) of the UAV measured by the TS 100. The TS 100 measures the location of the UAV by operating the target position calculating part 109. When the absolute location of the TS 100 is not obtained, the location information of the UAV is described by three-dimensional coordinate values (X, Y, and Z coordinate values and/or polar coordinate values) having origin at the location of the TS 100. The scheduled flight location obtaining part 203 obtains a scheduled location (latitude, longitude, and altitude) of the UAV at a specific time from the preliminarily obtained flight plan of the UAV.

When the TS 100 loses sight of the UAV, the search area setting part 204 sets a search area of the UAV by referring to the difference between the measured location of the UAV at a specific time and the scheduled flight location obtained from the flight plan. In this embodiment, the altitude is selected from the location data. This is because improvement in accuracy of location measurement in the altitude direction is an important issue due to the tendency to generate positioning errors, particularly in the altitude direction, in the location measurement using a GNSS. The UAV having the altimeter controls its own altitude by using a measurement value of atmospheric pressure. However, the accuracy of the altitude measurement by using the altimeter is not high and is affected by the variation in the atmospheric pressure due to weather or other factors. This also causes the deviation in the altitude of the UAV from the flight plan.

The measured location (hereinafter called "measured altitude") of the UAV is measured by the TS 100. Since the UAV flies while measuring its own location (altitude) by using a GNSS, the measured altitude agrees with the altitude of the flight plan if there are no positioning errors. However, the altitude information obtained by using the GNSS contains positioning errors, and the altitude information obtained from the altimeter also contains positioning errors, and therefore, the measured altitude is unlikely to agree with the altitude of the flight plan. In such a situation, in this embodiment, the search area setting part 204 performs the processing described below.

First, a difference between a measured altitude of the UAV at a specific time, which is measured by the TS 100, and the scheduled flight altitude, which is obtained from the flight plan, is calculated. The difference appears in some patterns. Typical appearing patterns of the difference between the measured altitude and the scheduled altitude will be described. The following describes an exemplary case in which the UAV measures its own location by using a GNSS at each second while the TS 100 also locates the UAV at each second. In this case, the UAV and the TS 100 synchronously operate by using navigation signals from the GNSS as synchronous signals. A configuration in which the UAV and the TS 100 do not synchronously operate is also applicable. In this configuration, the time when the UAV performs locating and the time when the TS 100 performs locating, which are close to each other, are used as the same time.

Assumptions are as follows: the altitude of the UAV of the flight plan is represented as h1, the altitude of the UAV measured by the TS 100 is represented as h2, and the calculation of the difference between h1 and h2 or the comparison between h1 and h2 is performed at a predetermined time interval (for example, at intervals of one second or at intervals of two seconds).

First Appearing Pattern of Difference
 There is no specific tendency in the frequency of obtaining h2 that is higher than h1 or obtaining h1 that is higher than h2.
Second Appearing Pattern of Difference
 The frequency of obtaining h2 that is higher than h1 is high.
Third Appearing Pattern of Difference
 There is a high frequency of obtaining h1 that is higher than h2.

The appearing patterns of the difference between h1 and h2 are roughly classified into the above three patterns. The occurrence of the three patterns depends on a locational relationship between a UAV mounted with a GNSS receiver and multiple navigation satellites used by the UAV, the condition of the ionosphere, weather condition such as cloudy weather, the location of the sun, and other factors. Since the UAV and the navigation satellites move, the occurrence frequency of the above appearing patterns of the difference can change rapidly over time.

The search area setting part 204 sets a search area of the UAV by using the relationship between h1 and h2. Examples of the setting processing are as follows.

First Setting Example

When the TS 100 loses sight of the UAV, a difference between h1 and h2, which is calculated at the time closest to this point of time is used to correct the scheduled flight location. Hereinafter, a specific example is described. It is assumed that the time when sight of the UAV is lost is represented as t0. In this case, assuming that the UAV continues flying at the altitude h2 (the altitude of the UAV measured by the TS 100) that is measured at the time closest to t0, a search area is set by correcting the scheduled flight altitude by the difference between h1 and h2.

In one case, h1 and h2 are measured immediately before sight of the UAV is lost, and have a relationship such that h2 is higher than h1. This case occurs when an altitude h2 that is higher than the scheduled altitude h1 of the flight plan is measured by the UAV. In this case, assuming that the lost UAV continues flying at the altitude h2 that is higher than the scheduled altitude by the difference of (h2−h1), a search area is set in an airspace at an altitude that is higher than the scheduled flight location of the flight plan by the difference of (h2−h1). That is, the positioning error in the altitude measured by the UAV is estimated from the value measured by the TS 100, and a search area is set considering this positioning error.

Figure 4A:
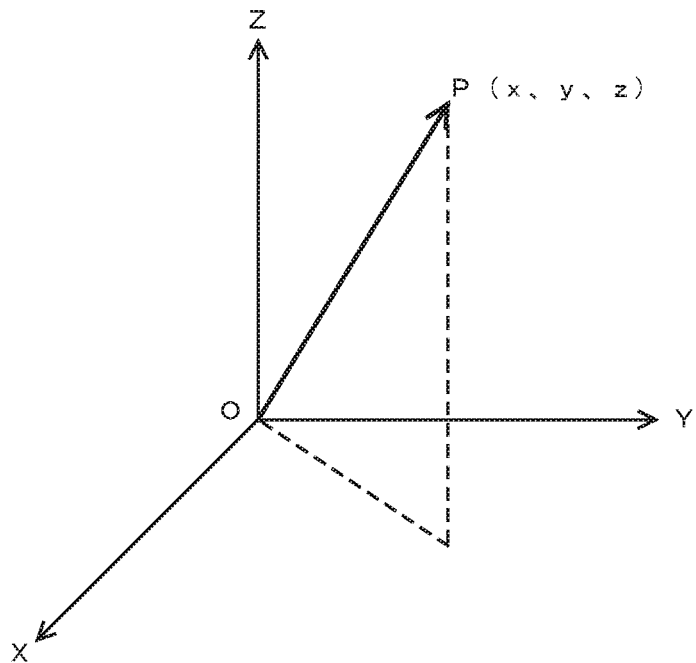
FIGS. 4A and 4B are principle diagrams showing a principle for determining a direction for searching for a UAV as seen from a TS.
Figure 4B:
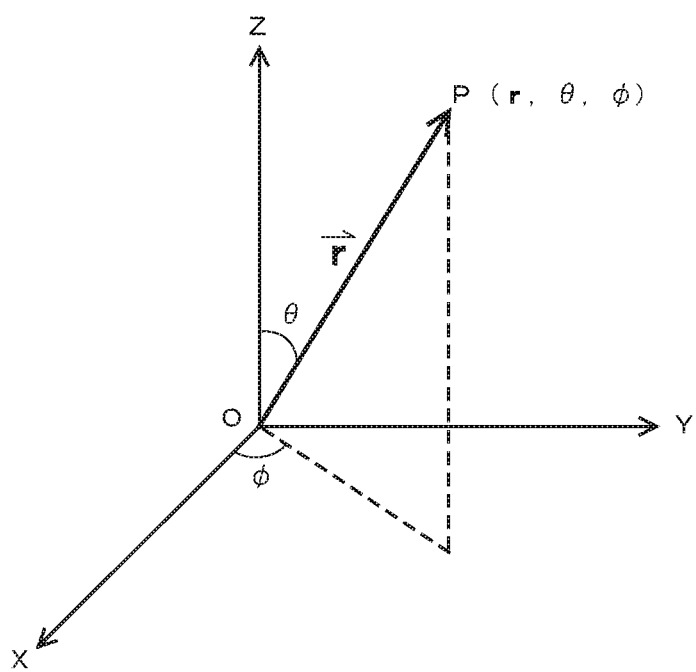

The above describes the details relating to setting of the search area. In practical processing, since the scheduled flight path of the UAV is specified by latitude, longitude, and altitude, values of X, Y, Z coordinates as shown in FIG. 4A having the location of the TS 100 as the origin are converted into values of polar coordinates as shown in FIG. 4B. Then, an area centering at angles φ and θ as seen from the TS 100 is set as a search area. The TS 100 scans the set angle areas that are defined by the angles φ and θ as the search area and searches for the UAV that the TS 100 has not tracked at that point in time. The scanning and the searching are also performed in the case of another setting example in the same manner.

Second Setting Example

When there is found a specific tendency in the difference between h1 and h2 that is calculated at each predetermined time, a search area is set by referring to the tendency. It is assumed that the time when sight of the UAV is lost is represented as t0. It is also assumed that a past calculation time (time when the difference between h1 and h2 is calculated) closest to t0 is represented as t0−1, a past calculation time second closest to t0 is represented as t0−2, a past calculation time third closest to t0 is represented as t0−3, and a past calculation time nth closest to t0 is represented as t0−n.

A specific tendency may be found in a value of Δf=h1−h2 at each of t0−n to t0. For example, the value of Δf fluctuates periodically in a specific range, or the value of Δf highly tends to appear in a specific range (for example, with a probability of 80%). In such cases, assuming that the tendency continues after sight of the UAV is lost, a search area is set in an airspace at an altitude that is estimated based on this assumption. In setting the search area, the location in the horizontal direction (latitude and longitude) is set by using the values based on the flight plan.

Other Operations of Search Area Setting Part 204

The search area setting part 204 can also perform the following processing. For example, the search area setting part 204 predicts the positioning error in the altitude direction generated by the UAV and sets a search area of the lost UAV on the basis of this prediction.

The TS 100 can perform high accuracy location measurement using relative positioning and can measure its own location at a precision on the order of centimeters. The TS 100 can also perform independent positioning, and thus, the TS 100 can perform positioning that generates a positioning error similar to the positioning error generated by the UAV. This is a common function of an ordinary GNSS receiver. In the technique described herein, the location of the UAV in flight is measured by using the TS 100, while the passed through flight path of the UAV is affected by the positioning errors generated due to the positioning technique of the UAV itself. When the degree of the positioning error in the independent positioning performed by the UAV and the degree of the positioning error in the independent positioning performed by the TS 100 are the same or similar to each other, the TS 100 can predict generation of the positioning error in the positioning performed by the UAV.

In particular, since the positioning error in the altitude direction occurs due to the positional relationship between the navigation satellite and the location that is measured, the degree of the positioning error generated by the TS 100 and the degree of the positioning error generated by the UAV are likely to be similar to each other with high probability in the condition that the TS 100 and the UAV are separated from each other by only about several hundred meters at most. In view of this, as described later, the degree of the positioning error in the altitude direction generated by the TS 100 and the degree of the positioning error in the altitude direction generated by the UAV are compared with each other. When this difference satisfies a predetermined condition, it is judged that the TS 100 can estimate the positioning error in the altitude direction generated by the UAV.

In response to this judgment, the TS 100 estimates the positioning error in the altitude direction generated by the UAV and sets the altitude of the search area of the lost UAV by referring to this estimation. For example, when a long time has passed after sight of the UAV is lost, the period of time is also long after the positioning information of the UAV cannot be obtained by the location measuring function of the TS 100. Thus, the TS 100 estimates the degree of the positioning error, which is generated by the UAV, by using the above-described technique and sets a search area of the UAV.

In another example, the combination of the navigation satellites used by the UAV may be changed after sight of the UAV is lost. In such a case, some of the navigation satellites that have been used by the UAV are not captured, and other navigation satellites are then newly used to perform location measurement. As a result, change in the tendency of the degree of the positioning error in the own location information measured by the UAV becomes more probable.

For example, under conditions in which the UAV performs positioning by using navigation signals from navigation satellites A1 to A5, a tendency to obtain a measured altitude that is higher than an actual altitude occurs. The navigation satellites move along their orbits, and thus, this tendency gradually changes. Still, this change has a consistency to some degree.

In another example, when navigation satellites A1 and A2 are not captured, navigation satellites A3 to A7 are used in the positioning instead. The relative positional relationships between the navigation satellites and the UAV are therefore changed, and thus, the tendency as described above is likely to change discontinuously with high probability. In an extreme case, a tendency to obtain a positive value for the positioning error is discontinuously changed to a tendency to obtain a negative value for the positioning error.

The techniques in the disclosed embodiments are performed by using the information obtained before sight of the UAV is lost. In these techniques, when the above-described change of the navigation satellites occurs after sight of the UAV is lost, the UAV may fly at an altitude that differs from a predicted altitude. In such a case, the TS 100 detects the change of the navigation satellites and performs positioning by newly using other navigation satellites, and then the TS 100 sets a search area of the UAV by referring to the positioning error in the altitude direction in this positioning. Thus, the change in the degree of the positioning error due to the change of the navigation satellites is reflected in setting the search area.

The error comparing part 205 compares the degree of the positioning error in the altitude direction generated by the TS 100 with the degree of the positioning error in the altitude direction generated by the UAV and judges whether the difference satisfies a predetermined condition. Hereinafter, this judgment will be described.

In this technique, the positioning error generated by the UAV is not directly measured by the TS 100. Instead, since the location of the UAV is determined by the TS 100, the difference between the altitude of the flight plan and the altitude of the UAV measured by the TS 100 is used as a positioning error δUAV in the altitude direction generated by the UAV.

When the difference between the positioning error δTS in the altitude direction generated by the TS 100 and the positioning error δUAV in the altitude direction generated by the UAV exceeds an acceptable limit, the positioning error in the altitude direction generated by the UAV is not appropriately estimated by the TS 100 because the estimation error will tend to be great. On the other hand, when the positioning error δTS in the altitude direction generated by the TS 100 and the positioning error δUAV in the altitude direction generated by the UAV can be regarded as the same or the difference therebetween is at the acceptable limit or less, the TS 100 estimates the positioning error in the altitude direction generated by the UAV and sets a search area of the lost UAV by using the estimated value.

The error comparing part 205 compares the positioning errors δTS and δUAV with each other and judges whether this difference is at a predetermined threshold value or less. This processing is repeated at a predetermined time interval. Under this condition, when the TS 100 loses sight of the UAV, and a search area must be set by using the positioning error δTS, a result of the above judgement performed at the time closest to this point of time is referred to. When the difference between the positioning errors δTS and δUAV is at the threshold value or less, a search area is set by using the positioning error δTS.

For example, when the TS 100 is located close to a large tree, it may be very likely that a combination of navigation satellites used by the TS 100 in positioning differs from a combination of navigation satellites used by the UAV in positioning. In such a case, the positioning errors δTS and δUAV tend to differ from each other, and therefore, the method of estimating the positioning error generated by the UAV by using the positioning error generated by the TS 100 can generate a large estimation error. Thus, the error comparing part 205 judges the applicability of the method of estimating the positioning error generated by the UAV by using the positioning error generated by TS 100.

Example of Processing

Figure 5:
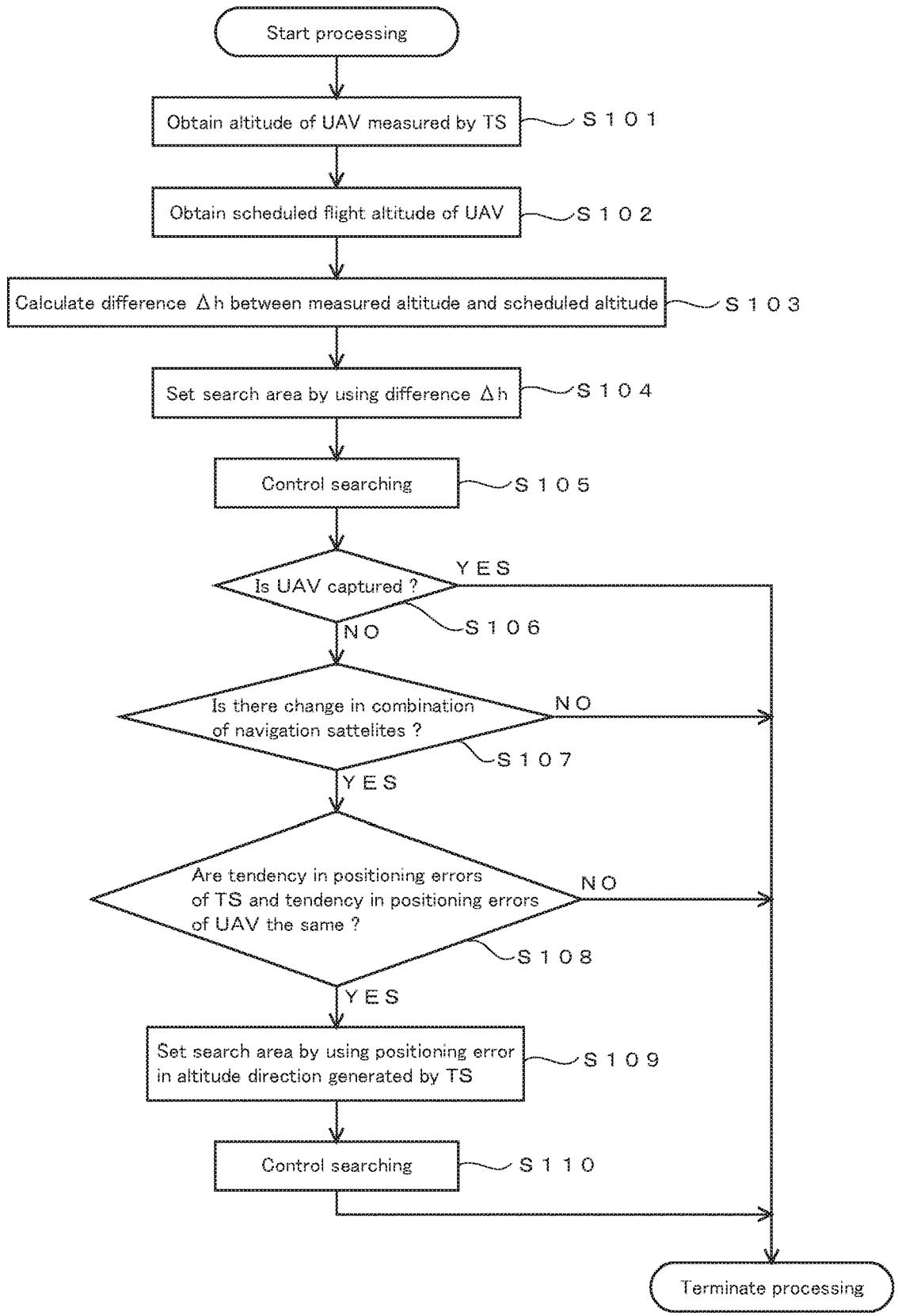
FIG. 5 is a flow chart showing an example of a processing procedure.

An example of processing that is executed by the UAV search area setting part 200 shown in FIG. 3 will be described. FIG. 5 shows an example of a processing procedure executed by the UAV search area setting part 200. Programs for executing the processing shown in FIG. 5 are stored in the storage 201 of the UAV search area setting part 200, in an appropriate storage medium, in a server in a network, or by other means, and are provided therefrom.

The processing shown in FIG. 5 starts when the TS 100 loses sight of the UAV. Prior to starting the processing shown in FIG. 5, that is, while the TS 100 captures the UAV that is flying, the error computing part 205 compares a positioning error in the altitude direction generated by the TS 100 with a positioning error in the altitude direction generated by the UAV and calculates a difference between the altitude of the flight plan and the measured altitude of the UAV, at a predetermined time interval, and these results are stored in an appropriate storage area.

When the TS 100 loses sight of the UAV, the processing shown in FIG. 5 starts. After the processing starts, first, information of the altitude of the UAV measured by the TS 100 before sight of the UAV was lost is obtained (step S101). This processing is performed by the measured location obtaining part 202. Next, information of the flight altitude at each past time is obtained from the flight plan of the UAV (step S102). The period of the data to be obtained is, for example, the 2 minutes immediately prior to the sight of the UAV being lost. This period can be freely set by a user. This processing is performed by the scheduled flight location obtaining part 203.

Then, a difference Δh between the altitude measured by the TS 100 in step S101 and the altitude obtained from the flight schedule in step S102 at each time is calculated (step S103). The difference Δh obtained in step S103 is used to set a search area of the lost UAV (step S104). The processing in step S103 and in step S104 is performed by the search area setting part 204.

In setting the search area, first, whether there is a specific tendency in the difference Δh is searched. When there is found a specific tendency, a search area is set assuming that this tendency continues. Otherwise, when no specific tendency is found in the appearing pattern of the difference Δh, a difference Δh at the time closest to the time when sight of the UAV is lost is used to set the search area. For example, the search area is set so as to have a range of the altitude, which is estimated from the flight plan, plus or minus Δh. The range in the horizontal plane in the search area is set so as to contain some extra areas on the basis of the flight plan. A period of time for searching the set search area is also set in addition to setting the search area.

Thereafter, the TS 100 searches for the UAV in the set search area by using its target searching function (step S105). When the UAV is captured at this stage, the processing is terminated (step S106). Otherwise, in a case in which capturing of the UAV has failed during the set period, the processing advances to step S107.

In step S107, the information from the navigation satellites captured by the location specifying part 107 of the TS 100 is used to judge whether the combination of the navigation satellites used is changed after sight of the UAV was lost. In a case in which there is no change in the combination of the navigation satellites used, it is judged that recapturing of the UAV would be difficult from that point in time, and thus, the processing is terminated.

In a case in which there is a change in the combination of the navigation satellites used, it is judged whether the tendency in the positioning error in the altitude direction generated by the TS 100 is the same as the tendency in the positioning error in the altitude direction generated by the UAV (step S108). This processing is performed by the error comparing part 205.

In this processing, first, fluctuations on the time axis are obtained as a first error profile. These fluctuations occur in the difference between the measured altitude, which is measured with high accuracy by the TS 100 in relative positioning, and the measured altitude, which is measured with low accuracy by the TS 100 in independent positioning. These altitudes are measured for a predetermined period (for example, 2 minutes) immediately prior to the sight of the UAV being lost. In addition, other fluctuations on the time axis are obtained as a second error profile. These fluctuations occur in the difference between the altitude of the flight plan and the altitude of the UAV measured by the TS 100, which are obtained for the same period as the period for the first error profile.

The first error profile and the second error profile are compared with each other to determine the similarity therebetween by using a threshold value. In a case in which there is a similarity therebetween, positioning errors are expected to occur with the same tendency as the tendency occurring in the above predetermined period, and the processing advances to step S109. In a case in which there is no similarity therebetween, the processing is terminated.

In step S109, a search area is set by referring to the positioning error in the altitude direction generated by the TS 100, and searching for the UAV is controlled (step S110). The processing details for setting the search area in step S109 are the same as in step S104 except for the used positioning error in the altitude direction.

Advantages

This embodiment performs searching for the lost UAV by taking into consideration the influences of the positioning errors in the altitude direction using the GNSS during tracking the UAV using the TS. Thus, this embodiment enhances the probability of recapturing the UAV. If the UAV is searched for without considering the positioning errors in the altitude direction, the UAV is much less likely to be found because the UAV flies at an altitude deviating from the flight plan due to its own positioning errors. On the other hand, the UAV is more likely to be found by taking the positioning errors in the altitude direction into consideration.

In the embodiment detail above, the TS 100 can track the UAV without determining its own absolute location with high accuracy. That is, the location of the TS 100 is determined by independent positioning to simplify the work. In this case, as preparation, the altitude of the location of the TS 100 is input to the UAV search area setting part 200. The measurement accuracy of this altitude is preferably high, but an altitude measured in simple measurement can also be used.

The TS 100 tracks the UAV from the start of the flight of the UAV, and a difference between the altitude measured by the TS 100 and the altitude of the flight plan is monitored. The TS 100 measures the altitude of the UAV by using the initially input altitude of the location of the TS 100 as a reference. Thereafter, when the TS 100 loses sight of the UAV, the processing from step S101 to step S105 shown in FIG. 5 is performed to search for the UAV. The processing in step S107 and in the subsequent steps is not performed in this embodiment.

A technique for continuously monitoring an UAV that is flying is required from the viewpoint of safety. The technique of this embodiment is applicable thereto. The technique of this embodiment enables rapid searching for a UAV by performing altitude correction on the basis of the flight plan when a TS loses sight of the UAV.

The UAV search area setting part 200 as shown in FIG. 3 may be configured as a separate control device. In this case, the UAV search area setting part 200 described with reference to FIG. 3 is a separate device. This control unit is connected to a TS via an appropriate communication channel such as a wireless communication network, and the control unit outputs a control signal to the TS to control the operation of the TS. This TS is configured so that its operation is controllable from outside.

The control device equipped with the UAV search area setting part 200 may be constructed of dedicated hardware, or the control device may have functions as shown in FIG. 3, which are performed by operation software installed in a PC, a tablet, a smartphone, or other electronic device. In a case of using a tablet, arithmetic operations that are difficult to perform using a tablet may be performed by an external device instead. The external device may be used in conjunction with the tablet to configure the UAV search area setting part 200 as a system. Such a configuration is not limited to the case of using the tablet, and the same configuration can also be applied to the case of using a PC, a smartphone, or other electronic device. The UAV search area setting part 200 may also be implemented by using a remote server. The server may be accessed via an internet channel or another channel from a tablet or a smartphone, and the tablet or the smartphone may be used as a terminal to perform the operation.

The functional parts as shown in FIG. 3 may also be configured as a system that is implemented by multiple separate hardware connected to each other via a communication channel. For example, a smartphone is used as a control terminal, a server or a PC is used as the storage 201, and an auxiliary unit is used to contain hardware for implementing the other functional parts, in its housing that has an adapter for connection to the TS. The auxiliary unit is communicable with the smartphone and the server via an internal channel or another channel. To perform the operation described in the exemplary embodiments, a flight plan data is downloaded from the server to the auxiliary unit, and the smartphone is used as a control terminal. In this case, the distributed functional parts integrally function as a system via a communication channel. This system executes the processing shown in FIG. 5.

What is claimed is:

1. An operating device configured to perform an arithmetic operation for searching for an unmanned aerial vehicle having mounted therein a location identifying device using a navigation signal from a navigation satellite, the operating device comprising:
    a measured location obtaining part that obtains information of a location of the unmanned aerial vehicle, which is measured by a surveying device;
    a scheduled flight location obtaining part that obtains information of a scheduled flight location of the unmanned aerial vehicle from a flight plan of the unmanned aerial vehicle;
    a search area setting part that sets an area for searching for the unmanned aerial vehicle by referring to a difference between the measured location and the scheduled flight location at a specific time; and
    a comparing part,
    wherein the measured location represents a measured altitude, and the scheduled flight location represents a scheduled altitude,
    wherein a location of the surveying device is preliminarily determined by relative positioning,
    wherein the comparing part determines whether a difference between a δUAV and a δTS is a predetermined threshold or less on a condition that a difference between the measured altitude and the scheduled altitude is represented as δUAV and a difference in the altitude direction of the surveying device between the location that is preliminarily determined by relative positioning and a location that is determined by independent positioning at the preliminarily determined location is represented as δTS, and
    wherein the area for searching for the unmanned aerial vehicle is set on a basis of the δTS in a case in which the difference between the δUAV and the δTS is determined as being the predetermined threshold or less.

2. An operating method for searching for an unmanned aerial vehicle having mounted therein a location identifying device using a navigation signal from a navigation satellite, the operating method comprising:
    obtaining information of a location of the unmanned aerial vehicle, which is measured by a surveying device;
    obtaining information of a scheduled flight location of the unmanned aerial vehicle from a flight plan of the unmanned aerial vehicle; and setting an area for searching for the unmanned aerial vehicle by referring to a difference between the measured location and the scheduled flight location at a specific time, wherein the measured location represents a measured altitude, and the scheduled flight location represents a scheduled altitude, wherein a location of the surveying device is preliminarily determined by relative positioning, wherein whether a difference between a δUAV and a δTS is a predetermined threshold or less is determined on a condition that a difference between the measured altitude and the scheduled altitude is represented as δUAV and a difference in the altitude direction of the surveying device between the location that is preliminarily determined by relative positioning and a location that is determined by independent positioning at the preliminarily determined location is represented as δTS, and wherein the area for searching for the unmanned aerial vehicle is set on a basis of the δTS in a case in which the difference between the δUAV and the δTS is determined as being the predetermined threshold or less.

3. An operating system configured to perform an arithmetic operation for searching for an unmanned aerial vehicle having mounted therein a location identifying device using a navigation signal from a navigation satellite, the operating system comprising:

a measured location obtaining part that obtains information of a location of the unmanned aerial vehicle, which is measured by a surveying device;

a scheduled flight location obtaining part that obtains information of a scheduled flight location of the unmanned aerial vehicle from a flight plan of the unmanned aerial vehicle;

a search area setting part that sets an area for searching for the unmanned aerial vehicle by referring to a difference between the measured location and the scheduled flight location at a specific time; and a comparing part, wherein the measured location represents a measured altitude, and the scheduled flight location represents a scheduled altitude, wherein a location of the surveying device is preliminarily determined by relative positioning, wherein the comparing part determines whether a difference between a δUAV and a δTS is a predetermined threshold or less on a condition that a difference between the measured altitude and the scheduled altitude is represented as δUAV and a difference in the altitude direction of the surveying device between the location that is preliminarily determined by relative positioning and a location that is determined by independent positioning at the preliminarily determined location is represented as δTS, and wherein the area for searching for the unmanned aerial vehicle is set on a basis of the δTS in a case in which the difference between the δUAV and the δTS is determined as being the predetermined threshold or less.

* * * * *